Dec. 28, 1948.     M. KLEIN     2,457,241

COASTER BRAKE

Filed Sept. 25, 1945

Inventor
*Mathias Klein*
By *John Babis Jr.*
Attorney

Patented Dec. 28, 1948

2,457,241

UNITED STATES PATENT OFFICE 2,457,241

COASTER BRAKE

Mathias Klein, Hawthorne, N. J., assignor to Curtiss-Wright Corporation, a corporation of Delaware Application September 25, 1945, Serial No. 618,505

9 Claims. (Cl. 192—6)

This invention relates to coaster brakes for bicycles and the like, and more particularly to an improved back-pedaling brake of the character wherein a pair of yieldable members are operable, respectively, to drive a wheel through its hub, to brake the same against rotation or permit freewheel rotation thereof in response to the selective manipulation of the pedal crank.

The invention has particular reference to a pair of spring coupling members which are independently operable, one to couple forward pedal movement to a wheel hub through a sprocket, and the other, to brake the wheel hub upon a rearward pedal movement, a prehensile clutch member being provided between said pair of coupling members adapted to receive torque indirectly upon rearward pedal movement whereby operation of the braking spring coupling member is initiated. The arrangement is such that upon cessation of forward pedal movement, as in coasting, the wheel hub rotates relatively to the spring coupling elements.

The invention has further reference to a pair of oppositely wound spring coupling members which are individually operable, one to couple forward pedal movement to a wheel hub through a sprocket, and the other, to brake the wheel hub upon a rearward pedal movement through said sprocket. The arrangement is such that the drive and brake spring members are preloaded in frictional end-to-end relation whereby the inner end of the drive spring is substantially held to permit the expansion or partial unwinding thereof for clutching engagement with the wheel hub, in response to forward pedal movement.

In a reverse or rearward pedal movement to braking position, the drive spring is contracted or wrapped out of substantial engagement with the wheel hub, and during such contraction, the brake spring is expanded into braking engagement with the wheel hub, in part by reason of the frictional contact between the drive and brake spring.

The principal object of the invention is to provide an improved coaster brake mechanism which represents the acme of simplicity in that it is constituted by a relatively few simple parts which are reasonable in cost of manufacture and are assembled and lubricated.

Another object of the invention is to provide an improved, simplified coaster brake mechanism which requires no adjustment after initial assembly especially adapted for use on bicycles.

With these and other objects in view, the invention resides in the novel construction, combination, and arrangement of parts, the novel features of which are set forth with particularity in the appended claims, the invention itself, however, both as to its organization and its method of operation, together with additional objects and advantages thereof, being best understood from the following description of a specific embodiment, when taken in connection with the accompanying drawing in which:

Figure 1:
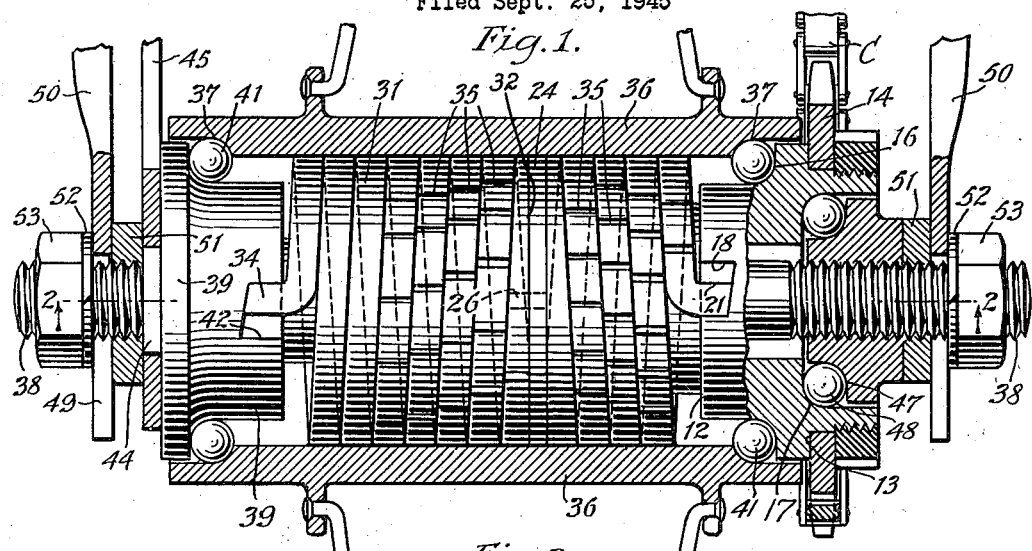
Figure 1 is a plan sectional view of the improved coaster brake mechanism as assembled in a wheel hub and the frame of a bicycle.

Referring to the drawing, wherein similar reference characters indicate corresponding parts throughout, the improved coaster brake mechanism comprises a cylindrical drive sleeve 10 having a plurality of annular shoulders 11, 12 and 13 formed thereon with one end of the sleeve 10, adjacent the shoulder 13, suitably screw threaded and provided with a drive sprocket 14 securely locked thereon and against the shoulder 13 by means of a ring nut 15.

Figure 2:
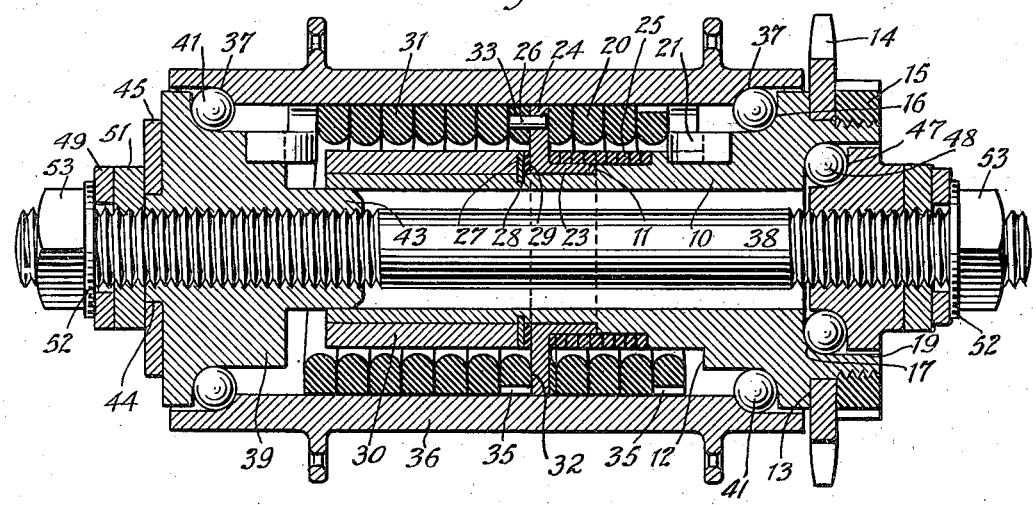
Fig. 2 is a sectional view taken on the line 2—2 of Fig. 1.

The drive sleeve 10 is further provided with complemental ball races 16 and 17 and with a rectangular slot or recess 18 in the shoulder 12, the ball race 16 being formed between the respective shoulders 12 and 13, and the ball race 17 within the counterbore 19 provided in the outer end of said drive sleeve as clearly shown in Figs. 1 and 2.

A coiled spring 20, adapted to function as a drive coupling or clutch member, and presenting convolutions of substantially rectangular cross section and in mutual contact, is provided on one end thereof with an angularly bent, laterally extending hook 21. As clearly shown in Fig. 2, the clutch spring 20 is positioned on the drive sleeve 10 in concentric, spaced relation with the hooked end 21, positioned in the slot or recess 18 provided therefor in the aforesaid shoulder 12. The opposite or inner end 22 of the clutch spring 20 extends to a point substantially intermediate the ends of the sleeve 10, and terminates in a ground end face, which presents a surface normal to the outer periphery of said spring and utilizable for a purpose hereinafter described.

Further in accordance with the invention, a prehensile clutch unit comprising a relatively short, cylindrical sleeve 23 with an annular flange 24 formed thereon and having one end portion of a relatively small spring 25 securely attached to said sleeve 23, is journaled on the drive sleeve 10, in abutting relation with the aforesaid shoulder 11, for rotational movement relative thereto, the remaining portion of the spring 25 being journaled normally, in free but close fitting relation on the circumference of the drive sleeve 10 beyond the shoulder 11. As in the case of the aforesaid clutch spring 20, the convolutions of the spring 25 are also substantially rectangular in cross section and in mutual contact.

For a purpose to be hereinafter described, the annular flange 24, forming a part of the sleeve 23, is provided with a radially disposed dowel pin 26 projecting horizontally from one face of the said flange 24.

The flanged sleeve 23 is retained against lateral movement on the drive sleeve 10, away from the shoulder 11, by means of a split snap ring 27 occupying an annular groove 28 formed in the drive sleeve 10, with a non-metallic anti-friction washer 29 interposed between the flange 24 and the snap ring 27. With the prehensile clutch unit thus assembled on the drive sleeve 10, the clutch spring 20 is preloaded to exert an axial thrust of substantially six ounces, more or less, against the face of the annular flange 24 whereby to substantially hold the innermost end convolution of the said spring 20 for a purpose hereinafter described.

The remaining reduced end portion of the drive sleeve 10, to the left of the aforesaid snap ring 27, as viewed in Fig. 2 is preferably, although not necessarily, increased to a diameter substantially equal to the external diameter of the aforesaid spring 25 by means of a cylindrical sleeve 30 press fitted over the said reduced end portion of the drive sleeve 10 as clearly shown in Fig. 2.

An additional spring 31, presenting convolutions which spiral in a direction opposite to the convolutions of the hereinbefore described clutch spring 20, and adapted to function as a brake member, are also substantially rectangular in cross section and in mutual contact. The inner end face 32 of the brake spring 31 is also ground normal to the outer periphery thereof and, in addition thereto, is provided with an aperture or hole 33 for the reception of the free end portion of the dowel pin 26, carried by the annular flange 24, whereby the inner end face of said brake spring is positioned in contacting engagement with the annular flange 24 and is mechanically connected thereto as clearly shown in Fig. 2. The opposite outer end of the brake spring 31 is also angularly bent to provide a laterally extending hook 34 for a purpose hereinafter described.

As clearly indicated on the drawing, the clutch spring 20 and the brake spring 31, are preferably, although not necessarily, each provided with a plurality of staggered transverse grooves or notches 35 in the external surface thereof whereby to provide sharp edges adapted for breaking through a film of oil or other suitable lubricant during operation thereof on the rotatable inner surface of a wheel hub 36.

The cylindrical wheel hub 36 having a uniform internal bore of a diameter slightly greater than the normal external diameter of the clutch and brake springs 20 and 31 respectively and provided with a ball race 37 substantially inwardly of each of its ends, is journaled on the drive sleeve 10 in concentric relation therewith by means of a plurality of anti-friction balls 41 between the external ball race 16 and one of the internal ball races 37 provided in the wheel hub 36.

The drive sleeve 10 and wheel hub 36 are journaled on an axle 38 provided with screw threads on each of its ends. A cone bearing 39, provided with a ball race 40, is on one end of said axle in adjustable relation thereto and in cooperative relation with the ball race 37 in the adjacent end of the wheel hub 36, a plurality of anti-friction balls 41 being disposed between the respective ball races 37 and 40 to provide an annular ball bearing.

The cone bearing 39 is further provided with an angular slot or recess 42 adjacent the ball race 40 and on a radius adapted to permit the free reception of the laterally projecting end hook 34 of the brake spring 31, whereby the outer end of the brake spring 31 is anchored.

The bearing 39 is also provided with a reduced inner end portion 43 which extends into the floating end of the drive sleeve 10 to provide a pilot bearing therefor, a relatively short shoulder 44 presenting a pair of spaced parallel flat surfaces being formed on the outer face of the cone bearing 39 for the reception of a torque arm 45 adapted to hold the said bearing 39 against rotation.

As clearly shown in Fig. 2, the axle extends concentrically through the drive sleeve 10 in spaced relation and with its threaded end extended beyond the counterbored end of said sleeve 10 for the threaded reception of a bearing cone, provided with a ball race 47. The race 47 cooperates with the internal ball race 17 and with a plurality of anti-friction balls 48 disposed between the respective ball races 17 and 47 to provide an annular ball bearing.

As will be understood by those skilled in the art, the improved coaster brake mechanism is attached to the forked ends 49 of a bicycle frame 50, for example, by means of the spacing washers 51, lock washers 52 and threaded nuts 53, the aforesaid torque arm 45 being held on the outer shoulder 44 of the bearing cone 39 and spaced from the adjacent frame end 49 by one of the spacing washers 51. The free end of the torque arm 45 (not shown) is secured to the bicycle frame 50.

Figure 4:
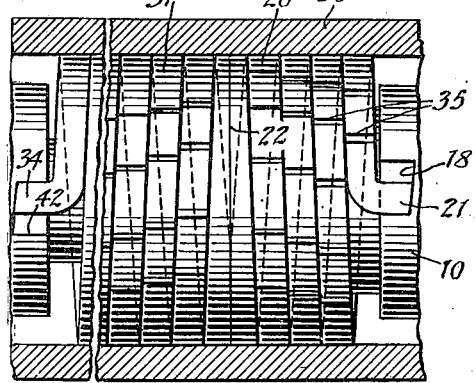
Fig. 4 is a fragmentary elevational view illustrating a modified form of the invention wherein the two main spring coupling members are preloaded in frictional end-to-end relation.
Figure 3:
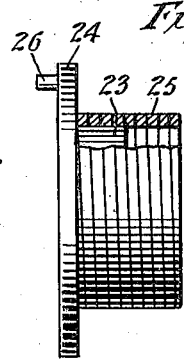
Fig. 3 is an elevational view of the prehensile clutch member per se.

In a modified form of the invention, illustrated in Fig. 4, the prehensile spring clutch unit journaled on the drive sleeve 10 in cooperative relation with the inner free ends of the clutch spring 20 and brake spring 31, as shown in Figs. 1 and 2, may be entirely dispensed with and the respective springs 20 and 31 preloaded in frictional end-to-end relation whereby the inner end of the clutch spring 20 is frictionally held by the inner end of the brake spring 31 and thus permit the expansion or unwinding of the clutch spring 20 into clutching engagement with the wheel hub 36 in response to clockwise rotation of the drive sleeve 10 through the sprocket 14.

In a braking operation, the winding up or contraction of the spring 20 causes the innermost end convolution of the spring 20 to impart a rotational movement to the innermost convolution of the brake spring 31 whereby the said brake spring is unwound or expanded into frictional engagement with the wheel hub 36. Otherwise, the opposite or outer ends of the springs 20 and 31 are anchored in the same manner as in Figs. 1 and 2.

*Operation*

Assuming that the improved coaster brake mechanism forms a part of a bicycle structure and that it is drivably connected to the pedal sprocket by a sprocket chain, as in Fig. 1, the operation of the said mechanism on the rear wheel hub in a forward pedaling operation is as follows:

From a state of rest, rotation of the conventional pedal sprocket in a forward or clockwise direction, causes rotation of the sprocket 14 by reason of the chain therebetween. Since the sprocket 14 is attached to the sleeve 10, the initial clockwise rotation of the sleeve 10 transmits torque to the anchored end 21 of the spring 20 whereby the convolutions thereof are expanded into locked frictional engagement with the wheel hub 36 with the result that the said hub is driven forward in response to forward pedal movement.

At the beginning of the forward pedaling operation, the convolutions of the spring 20 immediately engage the hub 36 by reason of the fact that the ground external diameter of said spring is of the order of 3 or 4 thousandths of an inch less than the internal diameter of the hub 36, and also by reason of the fact that the angularly formed inner wall defining the slot 18, in part, exerts an end thrust on the spring 20 as the sleeve 10 begins to rotate in response to forward pedal movement. Thus, the frictional contact between the inner end of the spring 20 and the flange 24 is enhanced to hold the inner end of said spring during the application of torque to its anchored end 21 to expand the same in response to forward or clockwise rotation of the sleeve 10.

During the aforesaid operation, the expansion of the spring 20, causes the oppositely wound brake spring 31 to remain in a contracted or nonoperative state by reason of the friction-slip engagement of the spring 20 with the annular flange 24 tending to wind or contract the said brake spring 31. Moreover, during this same operation, the flanged sleeve 23 and the auxiliary spring 25 attached thereto, remain substantially stationary relative to the rotating sleeve 10 by reason of the fact that the clockwise or forward sleeve rotation, tends to unwind the spring 25 out of frictional contact with the drive sleeve 10.

In a wheel braking operation, the sprocket 14 is moved in a counter-clockwise direction, in response to a back pedaling movement to full breaking position. Consequently, the sleeve 10 is also partially rotated in a counter-clockwise direction. By reason of the fact that the spring 20 is anchored, at one end, to the sleeve 10, the counter-clockwise rotation thereof will wind or contract the convolutions of said spring substantially out of frictional contact with the hub 36.

Simultaneously with the above noted contraction of the spring 20, the counter-clockwise rotation of the sleeve 10, also causes the prehensile spring 25, due to its light frictional contact with the said sleeve, to wrap down on the said sleeve, because of the direction in which it is wound, in response to the counter-clockwise rotation of the cylindrical sleeve 10 and thus transmit torque from the sleeve 10 through the flanged sleeve 23 to the brake spring 31. The aforesaid counter-clockwise movement of the flanged sleeve 23, by virtue of the mechanical connection between the flange 24 and the inner end of the brake spring 31, results in the expansion of the said spring into braking engagement with the wheel hub 36. Since the spring 31 is anchored at its outer end to the fixed bearing cone 39, the spring 31 is effective to brake the wheel hub 36 in accordance with the applied back pedaling pressure.

From the foregoing it will be readily apparent that in a coasting of free-wheel operation, the pedals are held stationary after a back pedal movement insufficient to cause the prehensile spring 25 to wrap down on the sleeve 10 with the result that the clutch spring 20 is contracted at least to its normal diameter and thus permit the free rotation of the wheel hub 36.

While the invention has been shown as applied to a wheel hub utilized in bicycle construction, other applications thereof are also feasible as, for example, in small power winches and also in other mechanisms wherein a smooth clutching, and de-clutching action between two relatively movable members is desirable.

Although one specific embodiment of the invention is shown and described, it is to be expressly understood that several modifications thereof are possible. The invention, therefore, is not to be restricted except in so far as is necessitated by the prior art and by the scope of the appended claims.

What is claimed is:

1. In combination, a fixed member, a cylindrical hub, a cylindrical drive sleeve disposed between said fixed member and said hub in concentric spaced relation, means journaling said hub and drive sleeve on said fixed member, means carried by said drive sleeve adapted to couple said sleeve to said hub upon rotation of said sleeve in one direction, additional means anchored with respect to said fixed member and supported by said sleeve adapted to frictionally engage said hub upon limited rotation of said sleeve in an opposite direction and prehensile means responsive to said last named rotation to engage said additional means with said hub.

2. In combination, a fixed axle, a cylindrical hub, a cylindrical drive sleeve disposed between said axle and said hub in concentric spaced relation, means journaling said hub and drive sleeve on said axle, a pair of coiled spring members carried by said drive sleeve in end-to-end relation, one of said spring members being adapted to couple said sleeve to said hub upon rotation of said sleeve in one direction, said other spring adapted to frictionally engage said hub upon rotation of said sleeve in an opposite direction and prehensile means on said drive sleeve responsive to said last named rotation to engage said additional means with said hub.

3. In combination, a fixed member, a cylindrical hub, a cylindrical drive sleeve disposed between said fixed member and said hub in concentric spaced relation, means journaling said hub and drive sleeve on said fixed member, means carried by said drive sleeve adapted to couple said sleeve to said hub upon rotation of said sleeve in one direction, additional means carried by said sleeve adapted to frictionally engage said hub upon limited rotation of said sleeve in an opposite direction, and prehensile means for transmitting torque indirectly from said drive sleeve to said second named sleeve carried means upon said rotation last named.

4. In a device of the character described, a fixed member, drive and driven members disposed one within the other in concentric spaced relation and journaled on said fixed member, a pair of expansible members carried by said drive member and individually operable to couple said drive member to said driven member, means for directly expanding one of said members into engagement with said driven member upon rotation of said drive member in one direction, and means including a coiled spring one way clutch for indirectly expanding the other of said members into engagement with said driven member upon rotation of said drive member in an opposite direction.

5. A hub driving and braking mechanism comprising a fixed axle, a hub rotatably journaled thereon, a cylindrical sleeve having a drive sprocket secured on one end thereof journaled on said axle substantially within said hub for rotation therewith relative to said axle, a spring clutch including an annular flange journaled on said sleeve intermediate its ends, a drive spring coiled about said sleeve with its inner end in frictional contact with said flange and its outer end anchored to said sleeve for rotation therewith, a stationary brake spring coiled about said sleeve with its inner end secured on the opposite side of said flange with its outer end anchored to a fixed journaling means disposed on one end of said axle, said sleeve being operable to expand said drive spring into driving engagement with said hub upon clockwise rotation of said sprocket and to contract said drive spring upon a limited counter-clockwise rotation of said sprocket whereby said clutch spring is wrapped down on said sleeve and said flange rotated to expand said brake spring into engagement with said hub.

6. A hub driving driving and braking mechanism comprising a drive sleeve, a hub and a fixed axle, said sleeve being journaled within said hub and said sleeve and hub on said axle for rotation relative thereto, means including an annular flange journaled on said drive sleeve, an expansible member carried by said sleeve with one end thereof in frictional engagement with said flange and its opposite end anchored to said sleeve, a second expansible member positioned about said sleeve with its inner end secured to said flange and its opposite end anchored to a bearing cone secured on one end of said axle, said sleeve being operable to expand said first named expansible member into driving engagement with said hub upon clockwise rotation of said sleeve, said first named expansible member operating to transmit a counterclockwise movement to said flange in response to limited reverse movement of said sleeve whereby said second named expansible member is expanded into braking engagement with said hub.

7. In a device of the character described, a fixed member, drive and driven members disposed one within the other in concentric spaced relation and journaled on said fixed member, expansible members carried by said drive member and individually operable to couple said drive member to said driven member and to couple said driven member to said fixed member respectively, means for directly expanding one of said members into engagement with said driven member upon rotation of said drive member in one direction, and means for indirectly expanding the other of said members into engagement with said driven member upon rotation of said drive member in an opposite direction, both of said last named means being entirely independent of said driven member.

8. A coaster brake comprising a wheel hub, a fixed axle shaft, a drive sleeve, oppositely wound friction springs adapted to frictionally engage the inner wall of said barrel when expanded, means for anchoring one end of one of said springs relative to said axle shaft, means for anchoring one end of the other spring to said sleeve, means frictionally retarding the other end of said last named spring upon rotation of said drive sleeve in one direction, and means for positively expanding said first mentioned spring when rotation of said drive sleeve is effected in the other direction, said last named means including a friction coil spring adapted to grip said sleeve when rotation is effected in such other direction.

9. A coaster brake comprising a wheel hub, a fixed axle shaft, a drive sleeve, oppositely wound friction springs adapted to frictionally engage the inner wall of said barrel when expanded, means for anchoring the outer ends of said springs relative to said fixed axle shaft and drive sleeve respectively, each spring being under slight axial compression derived from compression of the other, and one way clutch means between said sleeve and the inner free end of the axle shaft anchored spring to apply expanding torsion upon rotation of said sleeve in one direction.

MATHIAS KLEIN.

REFERENCES CITED

The following references are of record in the file of this patent:

UNITED STATES PATENTS

| Number | Name | Date |
|---|---|---|
| 1,149,149 | O'Horo et al. | Aug. 3, 1915 |
| 1,574,173 | Schall | Feb. 23, 1926 |